(12) United States Patent
Rose et al.

(10) Patent No.: US 6,237,893 B1
(45) Date of Patent: May 29, 2001

(54) HIGH PRESSURE AERATOR VALVE

(75) Inventors: Paul S. Rose, Coral Springs; Leonard Rose, Lake Worth, both of FL (US)

(73) Assignee: Myrlen, Inc., Coral Springs, FL (US)

( * ) Notice: Subject to any disclaimer, the term of this patent is extended or adjusted under 35 U.S.C. 154(b) by 0 days.

(21) Appl. No.: 09/562,462

(22) Filed: May 1, 2000

Related U.S. Application Data

(60) Provisional application No. 60/133,540, filed on May 11, 1999.

(51) Int. Cl.[7] .......................................... F16K 1/36
(52) U.S. Cl. ........................ 251/333; 251/63.6; 251/323
(58) Field of Search ................... 137/614.2, 614, 137/613, 528, 535, 538; 251/333, 323, 321, 62, 63, 63.6

(56) References Cited

U.S. PATENT DOCUMENTS

| | | | |
|---|---|---|---|
| 3,550,625 | * 12/1970 | Adams, Jr. | 137/614.2 |
| 4,300,750 | * 11/1981 | Valka et al. | 251/323 |
| 5,853,071 | * 12/1998 | Robinson | 251/323 X |

* cited by examiner

Primary Examiner—Kevin Lee
(74) Attorney, Agent, or Firm—John F. McDevitt

(57) ABSTRACT

An operationally improved gas powered metal discharge valve is disclosed having fewer non-welded internal parts to release pressurized gas into a storage vessel containing granular material for the purpose of aiding flow of the granular material from the storage vessel. Structural modification of the valve construction and the physical connection of said valve to the storage vessel are described.

18 Claims, 4 Drawing Sheets

HIGH PRESSURE AERATOR VALVE

RELATED PROVISIONAL APPLICATION

This application relates to Provisional Application Ser. No. 60/133,540 filed by the present applicants on May 11, 1999.

BACKGROUND OF THE INVENTION

This invention relates generally to a valve construction for releasing a relatively large volume of pressurized gas into a storage vessel containing granular material and the like for the purpose of accelerating the flow of said granular material therefrom and more particularly to modifying such valve construction for improved operation.

Discharging particulate material from an opening in a storage vessel is sometimes troublesome because of bridging, rat-holing or sticky build-up on the vessel walls which can occur anywhere in the vessel but usually occurs at the discharge outlet of the vessel. This clogging is often aggravated when the particulate material is moist or contains additives that make it sticky. Numerous attempts have been made in the past to alleviate this problem. For example, it has been proposed to mount one or more gas discharge devices on the vessel walls or sloping sides of hoppers containing particulate material. Such discharge aid devices have a nozzle extending into the hopper for directing a blast of gas into the hopper to reduce clogging and bridging of the material contents so that it can be discharged by conventional gravity or to assist other unloading equipment as disclosed in U.S. Pat. No. 3,788,527. While such prior art discharge aid devices, such as air blasters or air pulsers have met with varying degrees of commercial success, they all have open discharge ends which are subjected to particulate material and fines entering said openings thereby fouling the internal mechanisms and rendering them partially or completely inoperative. This shortcoming necessitates shutdowns for costly repair, cleaning and loss of production.

Also by the nature of construction for said prior art devices, close tolerances of the internal piston member to the surrounding outer housing are necessary for these blasters to operate efficiently. This creates a problem where temperature changes in the surrounding environment can cause binding between these parts causing eventual operational failure. These temperature variations can be seasonal or daily, caused by changing environmental conditions, or created by the industrial processes involved. A related serious problem occurring with operation of these prior art valve constructions is that of contaminating the stored particulate material with metal pieces derived from the valve itself or its mounting plate, such as weldment bits.

An aerator valve of this type now in wide commercial use has also been developed having fewer moving parts than disclosed in the aforementioned prior art patent. Unfortunately, said modified valve construction still remains prone to much of the above noted operational difficulties attributable at least in part to having critical components fabricated with weldments. Basically, said modified valve construction includes an outer housing with front and back ends terminating a central inner passageway, a movable piston member slidably engaged within the central passageway in said outer housing, a spring loaded piston guide member affixed within the central passageway in said outer housing intermediate the front and back ends, and a pneumatic valve mechanism supplying a pressurized gas medium to drive the piston member forward unseating the front end of said passageway and releasing the pressurized gas to the surrounding atmosphere. In constructing said commercial valve device, the piston member is designed with an enlarged head termination sealing the front end of the central passageway and with said member having been formed with multiple component parts joined together by conventional welds. More particularly, a machined rod is employed which is threaded into and welded to a separate enlarged head portion of said member and with the enlarged head portion further terminating with a welded end cap. Still further welding of a metal compression spring to the spring loaded piston guide member employed in said valve construction occasions frequent device failure during valve operation accompanied by introducing weld fragments into the storage vessel where employed.

To further overcome the aforesaid operational difficulties with this type valve device, there is now provided an improved pneumatic powered gas discharge valve construction having few internal parts and which can still further be affixed to assorted storage vessels in an improved manner. In doing so, the present valve device can be connected to a high flow pulse type electric solenoid valve for installation on one or more storage vessel side walls to direct repeated pulses of the pressurized gas medium being released between the particulate material being stored and the inner vessel wall. Multiple installations of the presently improved valve device are contemplated with individual valves being equally spaced about the side walls of said storage vessel when desired. Affixing of the presently improved valve construction to a storage vessel side wall or multiple side walls has also been simplified for cost reduction and required maintenance or valve removal. More particularly, the prior art valve installations customarily employ a flat mounting plate coupled to another flat mounting flange in order to physically secure the valve device to the vessel side wall and with the vessel side wall often having a curved contour requiring considerable welding to accomplish such manner of joinder. As distinct therefrom, the presently improved valve construction enables joinder of said valve device to the vessel side wall with conventional pipe couplings positioned into a suitable hole provided in the vessel side wall.

It is an object of the present invention, therefore, to provide an operationally improved gas powered discharge aid device having fewer non-welded internal working parts.

It is another object of the present invention to provide said presently improved gas discharge device in a manner requiring only a relatively simple modification of the component parts.

A still further object of the present invention is to provide improved means whereby the presently improved gas discharge device can be physically secured to the side walls of a storage vessel.

It is yet another object of the present invention to provide a novel cooperation between the presently improved gas discharge device and the mounting means whereby said device can be physically secured to a storage vessel side wall.

These and still further objects of the present invention will become apparent upon considering the following detailed description of the present invention.

SUMMARY OF THE INVENTION

It has now been discovered by the present applicants that non-welded construction for major internal parts of a metal gas powered discharge valve suitable for the above indicated purpose can essentially avoid contaminating the storage vessel with weld fragments. More particularly, having the movable metal piston member in said device fabricated with a one-piece unitary construction has been found to significantly avoid any formation and discharge of such contamination during piston movement when the valve is being operated. A like fabrication of the metal piston guide member in said device so as to have a one-piece unitary construction has also been found by the present applicants to avoid such contamination during operative cooperation of said member with the moving piston during valve operation. In doing so, the presently improved gas powered metal discharge valve basically comprises an outer housing with front and back ends terminating a central inner passageway, a movable piston member having said one-piece unitary metal construction slidably engaged within the central inner passageway in said outer housing, said piston member having an enlarged head termination sealing the front ends of said passageway, spring loaded piston guide member affixed within the central passageway in said outer housing intermediate the front and back ends, and a gas valve mechanism supplying a pressurized gas medium to the back end of the central passageway to drive the piston member forward unsealing the front end of said passageway and releasing the pressurized gas to the surrounding atmosphere. The overall shape of said gas powered discharge valve can be cylindrical including the modified one-piece piston and piston guide members with construction employing an iron alloy and with the gas valve mechanism employing pressurized air as the gas medium being discharged. Additionally, the outer surface of the metal housing member can be smooth as well as threaded with a conventional NPS pipe thread for engagement with alternative joinder means when affixed to the side wall of a storage vessel. In one embodiment, the enlarged head termination of the piston member physically abuts the front end of the central passageway in the outer housing and projects forwardly therefrom. A different embodiment has the enlarged head termination of the piston member shaped with a bevel contour enable physical abutment of said member with a mating bevel contour disposed on the front end surface of the central passageway in the outer housing. A still further embodiment of the present gas discharge device employs a hood element disposed at the front end of said device for operative cooperation therewith in directing the flow of released gas in a predetermined direction. Thus, the gas being released in such manner can be prevented from causing some vessel contents to be either spilled out or creating other operational disturbances.

Physically securing the present gas discharge valve to a side wall in the storage vessel can also be carried out in an improved manner still further reducing any likelihood of weld fragments entering the vessel. In a still further embodiment, the outer housing of the present gas discharge valve can be fitted with a surrounding collar type mounting plate which is secured thereto with conventional set screws. Employing an outer housing for said gas discharge device which includes a threaded outer surface further enables a threaded collar mounting plate to be physically joined thereto. A still further structural variation of the present discharge valve employing a cylindrical outer housing with a threaded outer surface enables physical joinder of said valve to a vessel side wall with a connecting conventional pipe coupling having a mating inner thread.

DETAILED DESCRIPTION OF THE PREFERRED EMBODIMENTS

Figure 1:
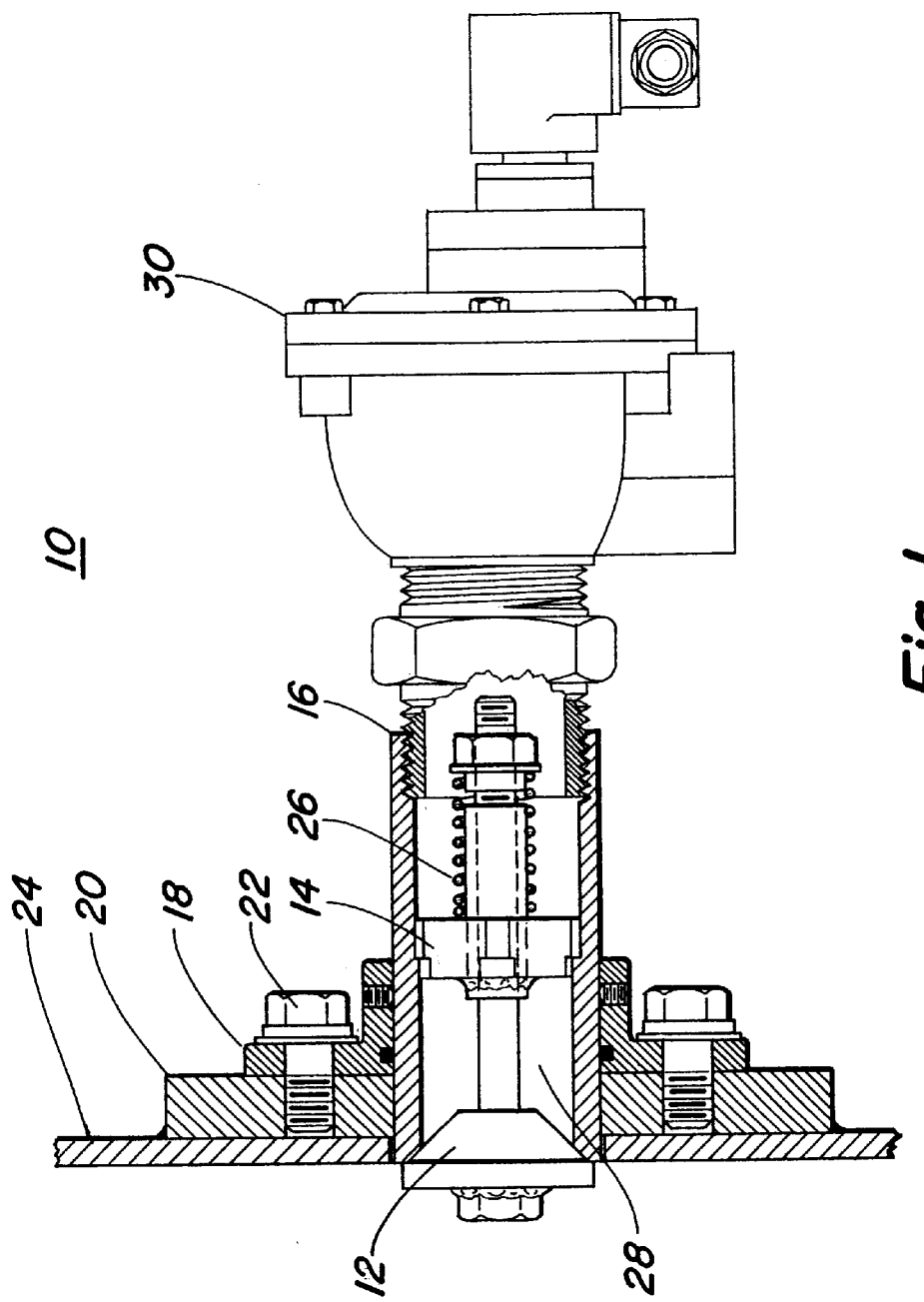
FIG. 1 is a side view partially in cross section for the previously described prior art gas powered discharge valve.

Referring to the drawings, there is shown in FIG. 1 a side view partially in cross section for the previously described prior art gas powered discharge valve 10 now in commercial use. As can be noted, the depicted valve construction employs a multi-part metal piston member 12 as well as a multi-part metal piston guide member 14 and with both of the component parts having been fabricated with weldments as also formerly pointed out. The cylindrical valve construction further includes outer metal housing 16 which has been physically secured to a metal flange 18 that in turn has been fastened to metal mounting plate member 20 with conventional threaded bolts 22. As further shown in the present drawing, mounting plate member 20 has been affixed to storage vessel side wall 24 with additional weldments. A compression spring 26 disposed against the back end of piston guide member 14 keeps the valve closed until actuated by an admission of a pressurized gas to the hollow central passageway 28 of the valve construction. A conventional electric solenoid valve mechanism 30 supplies a pressurized gas medium, such as air and the like, to the back end of the central passageway to drive piston member 12 forward unsealing the front end of the passageway and releasing the pressurized gas to the interior of the storage vessel. For operation, the solenoid valve mechanism 30 can be attached to a compressed air supply line (not shown) and when pulsed normally for a ¼ second time duration at gas pressures in the 40–100 psi range, the compression spring 26 is overcome and piston member 12 moves forward opening the discharge valve 10 and releasing the pressurized gas in a full circle direction. Upon pulse termination, the internal spring member 26 immediately reseats the piston member blocking any entry of granular material from the storage vessel into the inner valve body.

Figure 2:
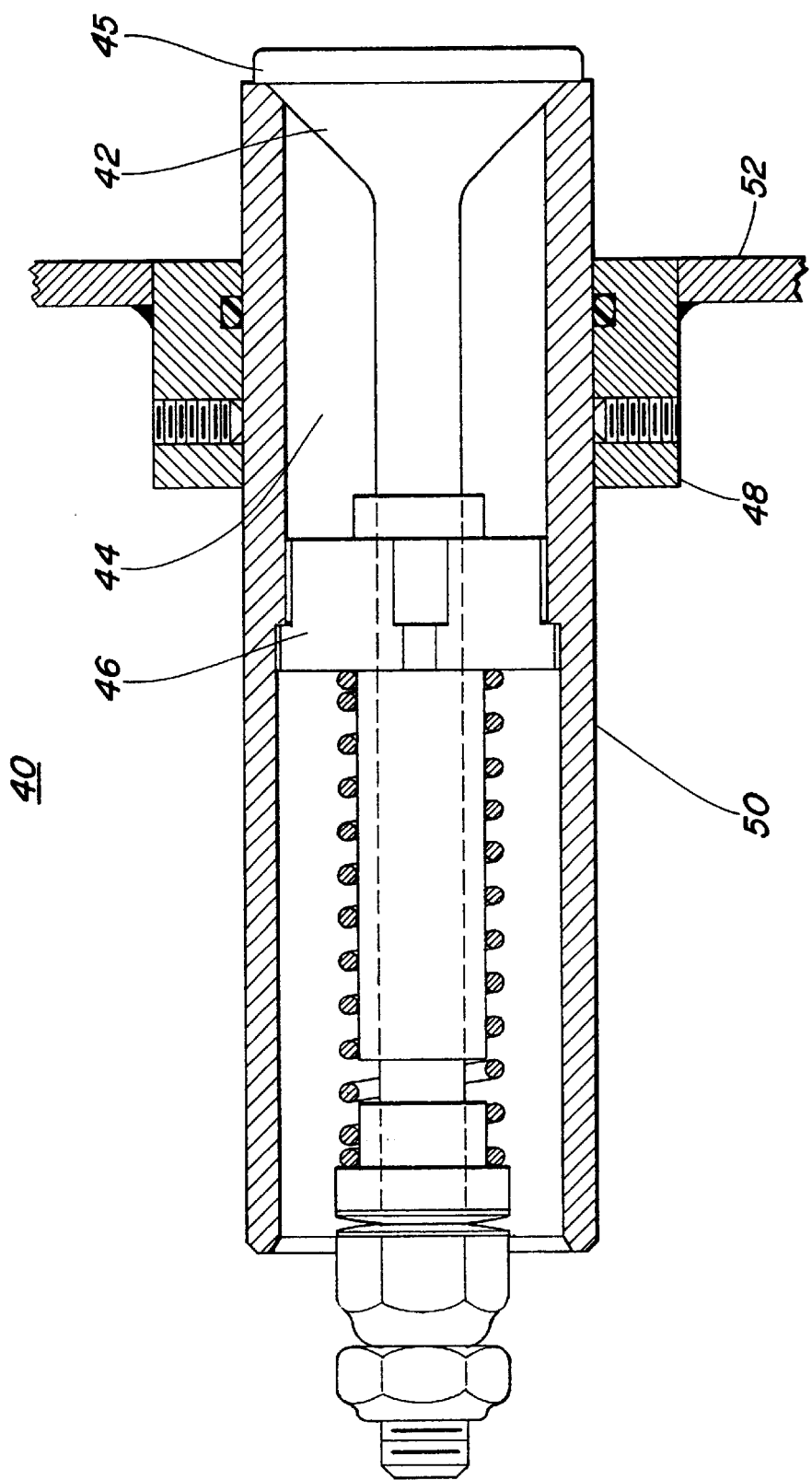
FIG. 2 is a side view partially in cross section for a representative gas powered discharge valve of the present invention.

In FIG. 2 a similar cross sectional view is shown depicting a representative gas powered discharge valve 40 of the present invention. The modified valve construction includes a one-piece unitary metal piston member 42 slidably engaged within a central inner passageway 44 of the valve body and with the piston member having an enlarged head termination 45 sealing the front end of the central passageway. As shown, the enlarged head termination of the movable piston member physically abuts with the front end surface of the central passageway and projects forwardly therefrom. There is again provided a spring loaded metal piston guide member 46 in the cylindrical valve construction to enable movement of the piston member as described for the FIG. 1 valve embodiment. As further shown in the present drawing, a surrounding metal collar 48 is affixed to the smooth outer surface of the housing member 50 in the present valve construction for the purpose of physically securing the valve to a storage vessel side wall 52.

Figure 3:
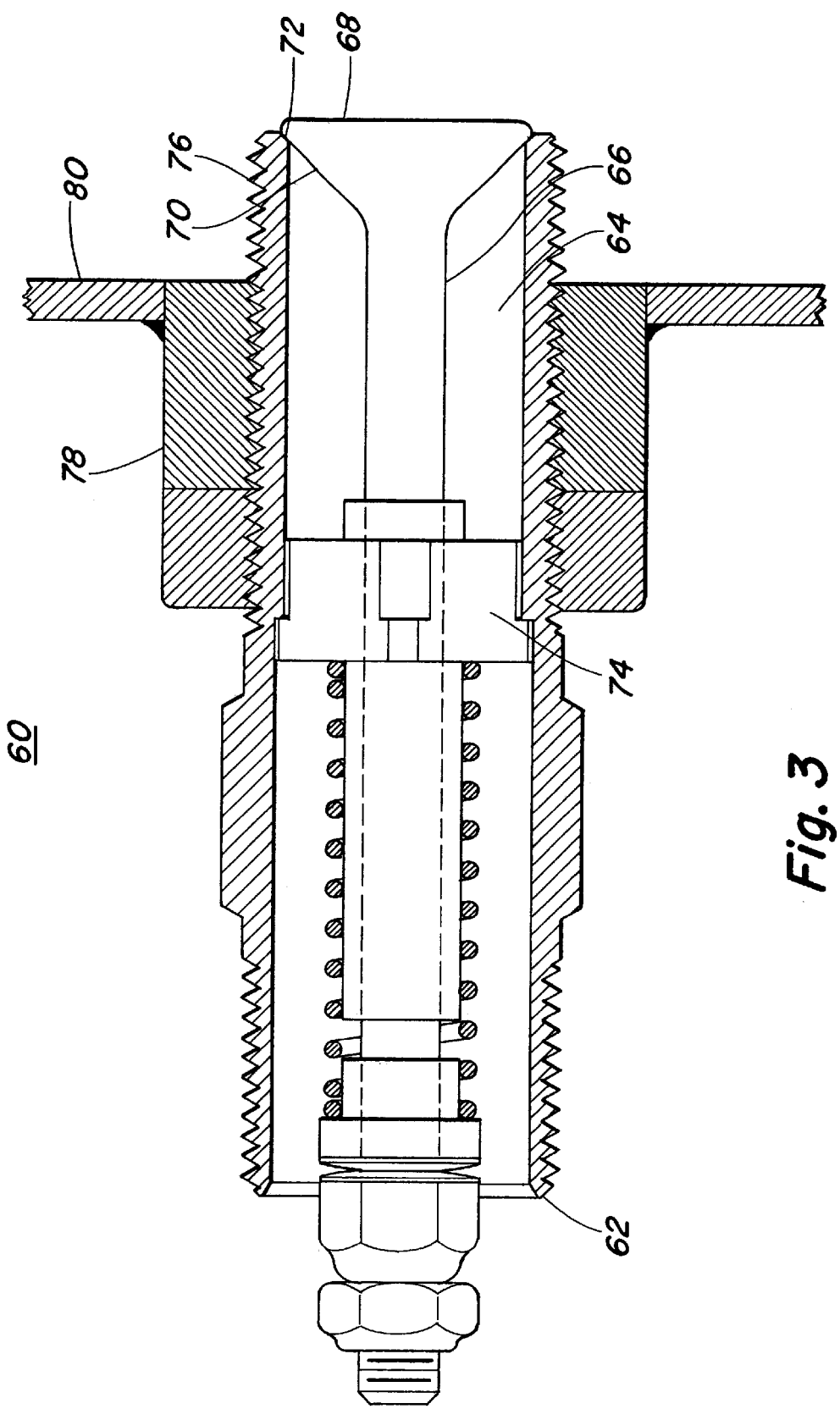
FIG. 3 is a side view partially in cross section for a different gas powered discharge valve construction according to the present invention.

FIG. 3 is a similar side view partially in cross section for a different gas powered valve construction according to the present invention. Accordingly, valve construction 60 includes an outer metal housing 62 with front and back ends terminating a central inner passageway 64. There is again included in the valve construction a one-piece unitary metal piston member 66 having an enlarged head termination 68 sealing the front end of said central passageway. As can be seen in the present drawing, the enlarged head termination of piston member 66 includes a bevel contour 70 enabling physical abutment of the member with a mating bevel contour 72 provided on the front end surface of the central passageway. The metal piston guide member 74 in valve 60 is also of a one-piece unitary construction to further reduce the risk of contamination posed by having internal welded parts in this type valve device. Outer cylindrically shaped housing member 62 further includes a threaded outer surface 76 enabling the valve device to by physically joined to a metal mounting collar 78 having mating inner threads. The collar member can be welded to the outer surface of a storage vessel wall 80 for the purpose of having the valve device suitably installed for operation in an improved manner. When installed in such manner, the valve embodiment can thereafter be repositioned with respect to its protrusion into the storage vessel by simply adjusting the threaded engagement. The flow path of the pressurized gas being released in the present embodiment proceeds in a more forward direction than takes place with the FIG. 2 valve embodiment which may prove advantageous under certain operating conditions.

Figure 4:
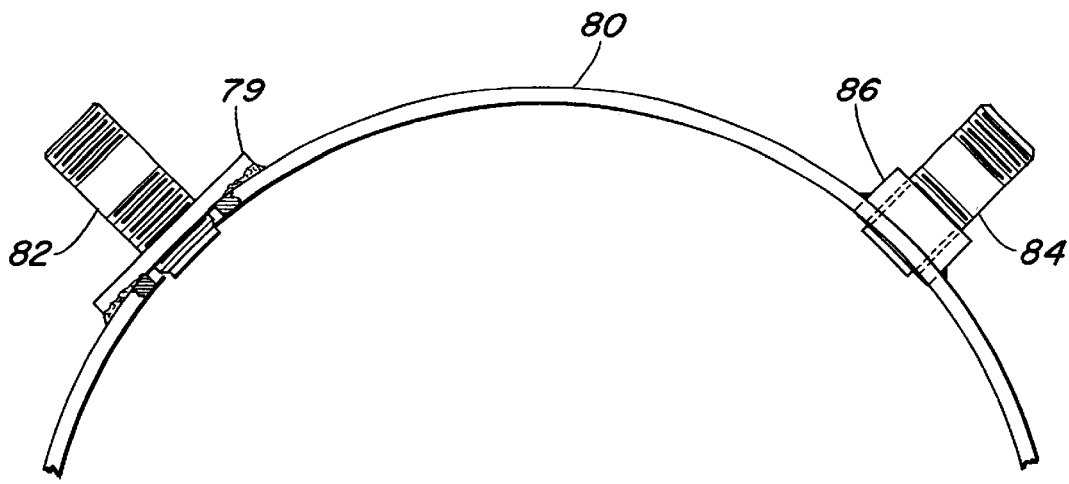
FIG. 4 is a perspective view depicting alternate means whereby the present gas powered discharge valve can be physically secured to a curved side wall in the storage vessel.

FIG. 4 is a perspective view depicting alternate means for joinder of the FIG. 3 discharge valve embodiment to a suitable opening provided in the storage vessel side wall. In one means depicted for such joinder, a flat metal mounting plate 79 is employed for welding to the curved outer surface of the vessel side wall 80 at the valve location. The depicted valve 82 can thereafter be threaded into said mounting plate at a front end placement suitable for valve operation as dictated by the particular requirements involved. A second means for suitable valve joinder to the storage vessel side wall is also depicted in the present drawing. Specifically, the depicted valve 84 can simply be threaded into a conventional metal coupling having mating inner threads 86 after said threaded coupling has been welded in place to the outer surface of said storage vessel side wall. Such latter valve installation eliminates problems associated with joining a flat mounting plate to curved surfaces of the storage vessel since welding costs are significant and could create brittleness in the vessel wall when extensively utilized.

Figure 5:
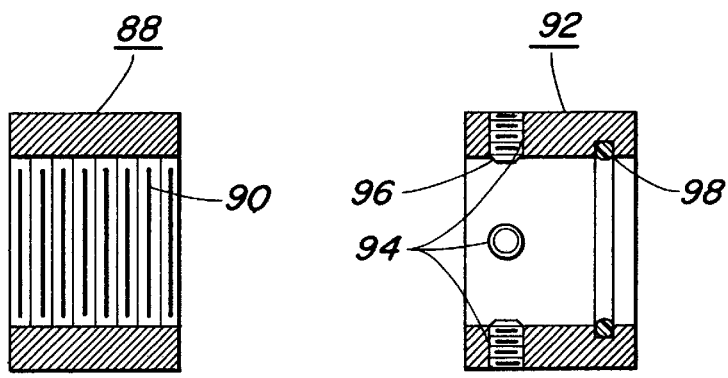
FIG. 5 depicts typical metal couplings which can be employed to physically secure the present gas powered discharge valve to a storage vessel side wall.

In FIG. 5 there is depicted typical metal mounting couplings which can be employed to physically join the above described valve embodiments of the present invention to a metal storage vessel side wall. Both couplings being illustrated require welding of said members to the exterior surface of the storage vessel wall for final installation of the particular discharge valve involved at the selected valve location. Accordingly, coupling 88 is of a cylindrical configuration with internal pipe threads and the like 90 being provided to accept a threaded engagement with the outer threaded surface 76 formed on the FIG. 3 discharge valve embodiment. Final installation for such valve assembly can be carried out in the identical manner previously described for joining the same valve and coupling members together. Coupling 92 is also of cylindrical configuration with equispaced openings 94 being provided in the wall of the member to accept conventional metal set screws 96. The depicted inner wall of the coupling is also provided with a conventional O-ring installation 98 which helps seal the coupling to the outer peripheral surface of the FIG. 2 valve embodiment. Joining of the valve and coupling members together simply requires tightening of the provided set screws with the final installation of the valve assembly being carried out in the same manner as described in the previous FIG. 4 embodiment.

Figure 6:
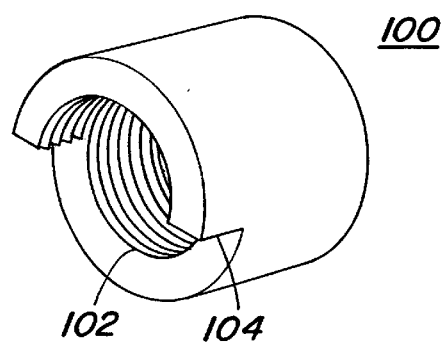
FIG. 6 is a perspective view for a representative hooded coupling which can be attached to the present gas powered discharge valve for directing the flow of the released gas in a predetermined direction.

FIG. 6 is a perspective view for a representative hooded metal coupling 100 which can be attached to the FIG. 3 discharge valve embodiment for the purpose of directing the flow of pressurized gas being released in a predetermined direction. The coupling member again has a cylindrical configuration with threaded central opening 102 being physically sized to accept the mating threaded outer surface provided on the FIG. 3 discharge valve embodiment. A semi-circular protrusion 104 is located on the front end of the coupling which can be formed simply by cutting or otherwise removing a portion of the front edge on the coupling. In doing so, the remaining metal protrusion forms a hood partially blocking the path of pressurized gas being released during valve operation which can be particularly useful for specified valve installations. In the herein illustrated valve embodiment, the hood protrusion is shown to block gas escape in a vertical upward location so that when installed in an open top storage vessel containing granular material and the like, there will be little opportunity for the stored material to be thrown out during valve operation. Understandably, a modification in the direction whereby gas flow is impeded by such means can be altered by simply twisting the attached coupling in the desired direction.

It will be apparent from the foregoing description that a broadly useful and novel gas powered discharge aid device has been provided which enables operation in a superior manner. It is contemplated that modifications can be made in the specific construction of the present valve device being employed, including metal materials of construction as well as methods of construction other than specifically herein illustrated, however, without departing from the spirit and scope of the present invention. For example, other metals than iron alloys can be selected for construction of the disclosed valve embodiments. Similarly, other known structural elements such as coupling nipples, lock nuts, surface treatments and shims can be added to the herein disclosed valve embodiments in a particular installation for possible improved operational characteristics of the resulting construction. Accordingly, it is intended to limit the present invention only by the scope of the appended claims.

What we claim as new and desire to secure by Letters Patent of the United States is:

1. A gas powered metal discharge valve helping to remove adhered granular material from a storage vessel and comprising:

(a) an outer housing with front and back ends terminating a central inner passageway;

(b) a movable piston member having a one-piece unitary metal construction slidably engaged within the central inner passageway in said outer housing, said piston member having an enlarged head termination sealing the front end of said passageway, (c) a spring loaded piston guide member also having a one-piece unitary metal construction which is fixed within the central passageway in said outer housing intermediate the front and back end; and (d) a gas valve mechanism supplying a pressurized gas medium to the back end of said central passageway to drive the piston member forward unsealing the front end of said passageway and releasing the pressurized gas to the surrounding atmosphere with sufficient force to cause the adhered granular material to become dislodged.

2. The valve of claim 2 wherein both housing and piston member have a cylindrical shape.

3. The valve of claim 2 wherein both housing and piston member are constructed with an iron alloy.

4. The valve of claim 2 wherein the housing has a smooth outer surface.

5. The valve of claim 2 wherein the housing has a threaded outer surface.

6. The valve of claim 1 wherein the pressurized gas medium is admitted to the central passageway in the outer housing by means of an electric solenoid valve.

7. The valve of claim 1 wherein the enlarged head termination of the piston member physically abuts with the front end surface of the central passageway in the outer housing and projects forwardly therefrom.

8. The valve of claim 1 wherein the enlarged head termination of the piston member includes a bevel contour enabling physical abutment of said member with a mating bevel contour disposed on the front end surface of the central passageway in the outer housing.

9. A storage vessel having interconnected side walls joined to a bottom outlet opening which further includes at least one gas powered metal discharge valve physically secured to a side wall opening in said vessel, said gas powered metal discharge device helping to remove adhered granular material from said storage vessel and comprising:
 (a) an outer housing with front and back ends terminating a central inner passageway;
 (b) a movable piston member having a one-piece unitary metal construction slidably engaged within the central passageway in said outer housing, said piston member having an enlarged head termination sealing the front end of said passageway;
 (c) a spring loaded piston guide member also having a one-piece unitary metal construction which is fixed within the central passageway in said outer housing intermediate the front and back ends; and
 (d) a gas valve mechanism supplying a pressurized gas medium to the back end of said central passageway to drive the piston member forward unsealing the front end of said passageway and releasing the pressurized gas to the surrounding atmosphere with sufficient force to cause the adhered granular material to become dislodged.

10. The storage vessel of claim 9 wherein the side walls in said storage vessel are joined to the bottom outlet opening by means of an inwardly sloping contour.

11. The storage vessel of claim 9 having a plurality of said gas powered metal discharge valves spaced apart about the side walls in said storage vessel.

12. The storage vessel of claim 9 wherein said gas powered metal discharge valve is physically secured to the sidewall in said storage vessel with a mounting plate.

13. The storage vessel of claim 12 wherein both storage vessel and mounting plate are metal and the mounting plate is physically secured to said vessel with weldments.

14. The storage vessel of claim 13 wherein said gas powered metal discharge valve is physically secured to said mounting plate with threaded fastener elements.

15. The storage vessel of claim 9 which further includes a hood element disposed at the front end of said gas powered metal discharge valve for operative cooperation therewith to direct the pressurized gas being released in a predetermined direction.

16. The storage vessel of claim 15 wherein said hood element is physically secured to the gas discharge valve.

17. A metal storage vessel having a plurality of interconnected side walls joined to a bottom outlet opening which further includes a pneumatic powered metal discharge valve physically secured to openings provide in the side walls of said vessel, said pneumatic powered metal discharge valves helping to remove adhered granular material from said storage vessel and each comprising:
 (a) an outer cylindrical metal housing having a smooth outer surface with front and back ends terminating a central inner passageway;
 (b) a movable piston member having a one-piece unitary metal construction slidably engaged within the central inner passageway in said outer housing, said piston member having an enlarged head termination sealing the front end of said passageway;
 (c) a spring loaded piston guide member having a one-piece unitary metal construction fixed within the central passageway in said outer housing intermediate the front and back ends;
 (d) a pneumatic valve mechanism supplying pressurized air to the back end of said central passageway to drive the piston member forward unsealing the front of said passageway and releasing the pressurized air to the surrounding atmosphere with sufficient force to cause the adhered granular material to become dislodged;
 (e) each of said pneumatic powered metal discharge valves being physically secured to a metal mounting plate with threaded fastener elements; and
 (f) each of said metal mounting plates being welded to the outer surface of a vessel wall opening at the gas discharge valve location.

18. A metal storage vessel having a plurality of interconnected side walls joined to a bottom outlet opening which further includes a pneumatic powered metal discharge valve physically secured to openings provided in the side walls of said vessel, said pneumatic powered gas discharge valves helping to remove adhered granular material from said storage vessel and each comprising:
 (a) an outer cylindrical metal housing having a threaded outer surface with front and back ends terminating a central inner passageway;
 (b) a movable piston member having a one-piece unitary metal construction slidably engaged within the central passageway in said outer housing intermediate the front and back ends;
 (c) a spring loaded piston guide member having a one-piece unitary metal construction fixed within the central passageway in said outer housing intermediate the front and back ends;
 (d) a pneumatic valve mechanism supplying pressurized air to the back end of said central passageway to drive the piston member forward unsealing the front end of said passageway and releasing the pressurized air to the surrounding atmosphere with sufficient force to cause the adhered granular material to become dislodged;
 (e) each of said pneumatic powered metal discharge valves having a threaded mounting plate physically joined to the outer threaded surface of the housing member; and
 (f) each of said metal mounting plates being welded to the outer surface of a vessel wall opening at the gas discharge valve location.

* * * * *